(12) United States Patent
Maeda et al.

(10) Patent No.: US 6,423,158 B1
(45) Date of Patent: Jul. 23, 2002

(54) ROLLING BEARINGS AND GEAR SHAFT SUPPORT DEVICE

(75) Inventors: Kikuo Maeda; Hirokazu Nakashima; Akio Okayama, all of Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/461,187

(22) Filed: Dec. 15, 1999

(30) Foreign Application Priority Data

| Dec. 17, 1998 | (JP) | 10-359396 |
| Dec. 17, 1998 | (JP) | 10-359409 |
| Dec. 17, 1998 | (JP) | 10-359462 |
| Jun. 7, 1999 | (JP) | 11-159028 |
| Jun. 7, 1999 | (JP) | 11-159147 |
| Jun. 7, 1999 | (JP) | 11-159154 |
| Jun. 22, 1999 | (JP) | 11-175761 |

(51) Int. Cl.$^7$ .............. C23C 8/32; C23C 8/56; C23C 8/76
(52) U.S. Cl. .......... 148/319; 148/219; 148/221
(58) Field of Search .............. 148/906, 218, 148/221, 219, 319; 420/99, 100, 104; 384/492, 912

(56) References Cited

U.S. PATENT DOCUMENTS

| 3,607,459 A | * | 9/1971 | Mitacek ............... 148/637 |
| 4,773,947 A | * | 9/1988 | Shibata et al. ............. 148/221 |
| 5,413,643 A | * | 5/1995 | Murakami et al. .......... 148/319 |
| 5,415,705 A | * | 5/1995 | Furumura et al. .......... 148/319 |
| 5,456,766 A | * | 10/1995 | Beswick et al. ............ 148/216 |
| 5,672,014 A | * | 9/1997 | Okita et al. ................. 384/492 |

FOREIGN PATENT DOCUMENTS

| JP | 62-29487 | 6/1987 |
| JP | 07-190072 | 7/1995 |

* cited by examiner

Primary Examiner—Roy King
Assistant Examiner—Harry D. Wilkins, III
(74) Attorney, Agent, or Firm—Wenderoth, Lind & Ponack, L.L.P.

(57) ABSTRACT

A roller bearing which can sufficiently ensure an endurance life of rollers even under conditions where debris contamination and temperature rise are large. As the material for an outer ring, inner ring and tapered rollers, a steel in which the Si and Mn contents are increased is used, and after it has been treated to carbo-nitriding, it is quenched to adjust the amount of retained austenite in the carbo-nitrided layer formed on the surface layer of each part to 20–50 vol %. Thus, it is possible to prevent surface peeling resulting from initiation and propagation of cracks,. thereby greatly improving the endurance life of the rolling bearing under conditions in which debris contamination or temperature rise at bearing portions is large.

14 Claims, 4 Drawing Sheets

ND GEAR SHAFT
ROLLING BEARINGS AND GEAR SHAFT SUPPORT DEVICE

BACKGROUND OF THE INVENTION

The present invention relates to a rolling bearing suitable for use under conditions where debris contamination and the temperature rise are large, and to an automotive gear shaft support device using the rolling bearing.

Figure 1:
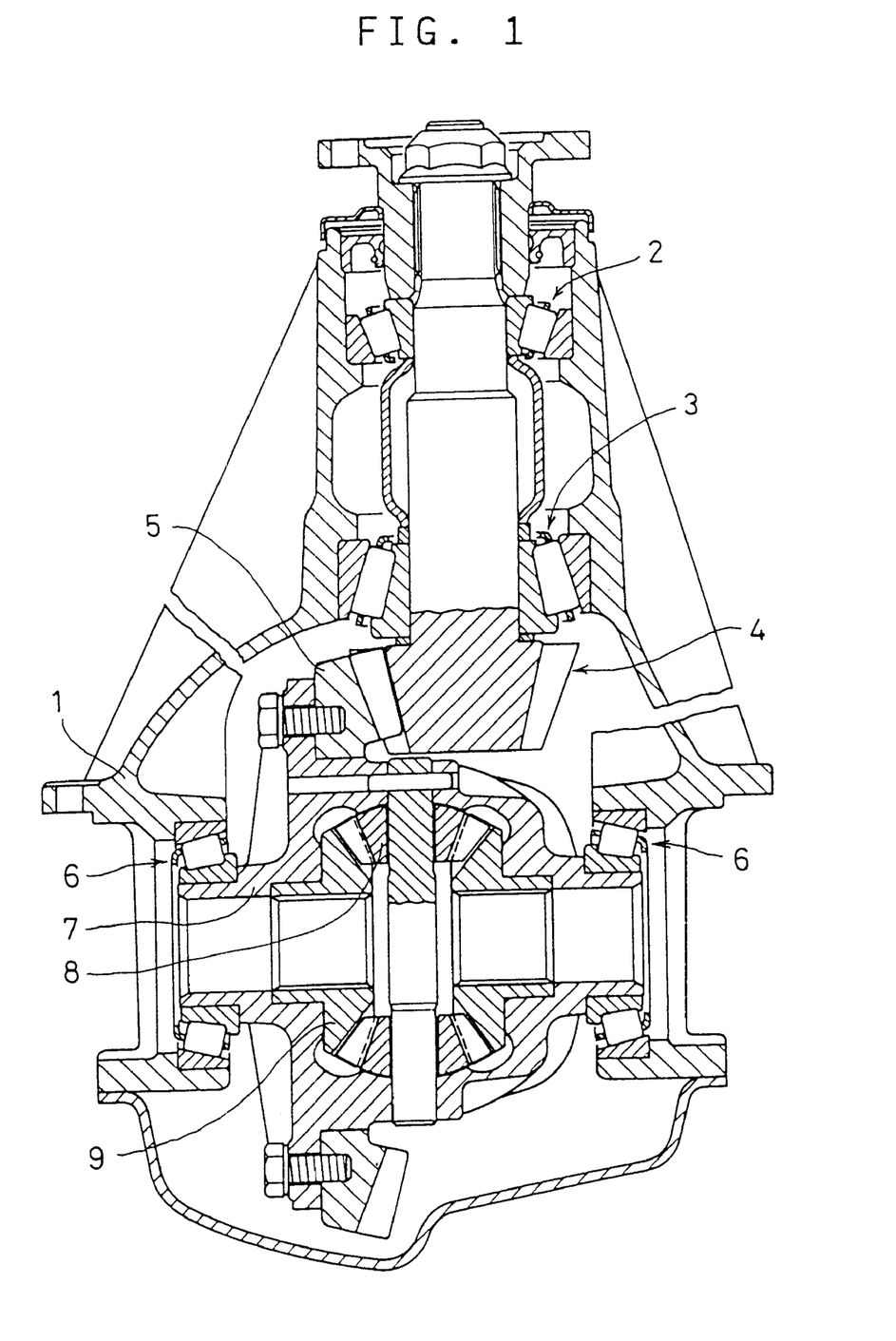
FIG. 1 is a vertical sectional view of a differential in which is mounted a gear shaft support device.

In an automotive differential or transmission, rolling bearings are used to support gear shafts. FIG. 1 shows an automotive differential in which a gear shaft is supported by a tapered roller bearing, which is one of the embodiments of the present invention. The differential comprises a drive pinion 4 rotatably supported in a housing 1 by two tapered roller bearings 2, 3, a ring gear 5 meshing with the drive pinion 1, a differential gear case 7 carrying the ring gear 5 and rotatably supported in the housing 1 by a pair of tapered roller bearings 6, pinions 8 mounted in the differential gear case 7, and a pair of side gears 9 meshing with the pinions 8. These are mounted in the housing 1 in which is sealed oil. The oil also serves as a lubricating oil for the tapered roller bearings 2, 3 and 6.

Since a power transmission device such as the above-described differential have many gear meshing portions and rotary member sliding portions, debris such as metallic powder produced at these portions tend to mix into oil sealed in the housing. Such powder may enter into rolling bearings which support gear shafts rotating at high speed and get caught into the raceways of rolling elements, thus causing surface peeling on the rolling elements or bearing rings. It is considered that such surface peeling is caused by initiation of cracks resulting from indentation due to debris.

In order to prevent initiation and progression of such cracks, in examined Japanese patent publication 62-29487, a technique is disclosed in which SUJ3-class steel is used as a bearing material, it is quenched at high temperature to increase the amount of retained austenite, and the cooling speed during quenching is slowed down to decrease crack sensitivity. In unexamined Japanese patent publication 7-190072, SUJ3-class steel is used for a bearing ring material, and carbo-nitriding is added to the above mentioned heat treatment to further increase the amount of retained austenite in the surface layer.

On the other hand, in recent use of roller bearings, in order to improve the rotation efficiency during high-speed rotation, there is a tendency to use a low-viscosity lubricating oil. Thus temperature rise at bearing portions tends to be large with an increase in metal-to-metal contact. In such use, because rolling elements are small in heat capacity and diffusion of heat due to contact with other members is small, their temperature rise is the largest. Thus, surface peeling tends to occur at the surface of rolling elements. Even if the material disclosed in Japanese patent publication 62-29487 is used, fatigue life is insufficient.

Further, with a tapered roller bearing, since each tapered roller rolls with its large end face guided by the large rib surface of the inner ring, a thrust load is loaded on the large rib surface of the inner ring. If the material disclosed in Japanese patent publication 7-190072 is used for the inner ring, although the rolling contact fatigue life under debris contamination may improve, the fatigue life of the rib portion bearing thrust load decreases.

An object of this invention is to provide a rolling bearing and an automotive gear shaft support device which can ensure a long endurance life even under use conditions where debris tends to enter and temperature rise is large.

SUMMARY OF THE INVENTION

According to this invention, there is provided a rolling bearing wherein rolling elements are made from a steel containing C: 0.8–1.5 wt %, Si: 0.4–1.2 wt %, Mn: 0.8–1.5 wt % and Cr: 0.8–1.8 wt %, wherein the steel is subjected to carbo-nitriding, and then quenched and tempered so that the amount of retained austenite in the surface portion is 20–50 vol %.

As for the composition of the steel as the material for the rolling elements, the carbon content should be 0.8 to 1.5 wt % to obtain basic hardness by quenching and also to increase the retained austenite.

The silicon (Si) content should be not less than 0.4 wt % to stabilize the retained austenite in the surface layer and to prevent softening at high temperature by adding Si, which has resistance to temper-softening. The upper limit is set at 1.2 wt % because if over 1.2 wt %, diffusion of carbon and nitrigen is prevented during carbo-nitriding.

The Mn content should be 0.8 to 1.5 wt % to increase hardenability and increase the amount of retained austenite in the surface layer. Excessive Mn content will result in lowering of cold workability and quenching crack. Also, the amount of retained austenite in the surface layer will be too large, so that quenching hardness tends to be low. Thus the upper limit is restricted to 1.5 wt %.

The Cr content should be 0.8 to 1.8 wt % because if less than 0.8 wt %, carbides would not be sufficiently formed even by carbo-nitriding, so that the hardness tends to decrease during temperature rise. If over 1.8 wt %, carbides tend to grow coarse and become starting points of cracks due to stress concentration during rolling contact.

By using a steel having such a composition as the material for rollers and increasing the nitrogen content in the surface layer by carbo-nitriding, the Ms point (martensitic transformation starting temperature) in the surface layer becomes lower than in the inner portion. By quenching such a steel, the amount of retained austenite increases in the surface layer of the rollers. The amount of retained austenite in the surface layer can thus be increased to 20 vol % or over.

Retained austenite has high toughness and work hardening properties, and serves to prevent crack initiation and propagation. But it is unstable to heat. Nitrogen atoms that have penetrated into the surface layer during the carbo-nitriding will solid soluted in austenite and make the retained austenite after quenching stable to heat. Also, the surface layer, in which the Ms point has decreased, the martensitic transformation begins later than in the core, and the transformation amount is smaller than in the core, so that compressive residual stress is formed in the surface layer. Thus, it is also possible to increase the fatigue strength of the surface layer.

The amount of retained austenite in the surface layer should be 20 to 50 vol % to give the surface layer suitable toughness, and to relieve stress: concentration due to contact with debris. If it is less than 20 vol %, toughness is not sufficient. If over 50 vol %, hardness will decrease remarkably, thus inviting deterioration in the surface roughness due to plastic deformation.

If debris gets caught or if the surface temperature rise is large, crack tends to initiate at the surface or at the subsurface (within 0.1 mm from the surface). Thus it is possible to prolong the life by improving the material of the surface layer in the above-described manner.

As the heat treatment including carbo-nitriding, carbo-nitriding may be carried out in a high-temperature gas in which ammonia gas is added to a carburizing atmosphere, and then followed by quenching and tempering. To adjust the amount of retained austenite, sub-zero treatment may be combined in the heat treatment step.

By adding 0.3 wt % or less of molybdenum to the steel as the material for rolling elements, it is possible to improve toughness.

Also, by quenching at 830–880° C. and adjusting the cooling ability H during quenching in the temperature range of from 300° C. to 150 ° C. to 0.2 cm$^{-1}$ or less, it is possible to slow down the cooling speed near the Ms point and to decrease the cracks sensitivity to 3 or less. If the crack sensitivity is 3 or less, it is possible to effectively prevent cracks during use, or to prevent the crack propagation speed even if cracks should initiate. As a means for adjusting the cooling ability during quenching in the temperature range from 300° C. to 150° C. to 0.2 cm$^{-1}$ or less, quenching in an oil or salt bath heated to a predetermined temperature may be employed.

If the rolling elements are needle rollers, and the amount of retained austenite in the surface layer is 20 to 40 vol %, and the surface hardness is Hv 750 or more, it is possible to prevent surface peeling of needle rollers and to prolong their life, even though they tend to heat up because they are low in heat capacity and are often mounted on a roughly finished shaft without a bearing ring.

The upper limit of the amount of retained austenite is set at 40 vol % to obtain a surface hardness of Hv 750 or over. Also, the surface hardness should be Hv 750 or over to ensure sufficient surface hardness even if the needle rollers, which are subjected to severe temperature rise, soften.

If the rolling elements are tapered rollers, wherein, of the inner and outer rings of the rolling bearing, at least the inner ring is made from case-hardened steel containing 0.4 wt % or less of carbon, and wherein on the surface layers of the inner and outer rings, carbo-nitrided layers are formed, it is possible to ensure fatigue strength of the rib portions of inner ring. If the carbon content exceeds 0.4 wt %, the core hardness during quenching would be too high, so that toughness becomes inferior and fatigue strength lowers. For the outer ring, it will do if a carbo-nitrided layer can be formed. Thus, besides case-hardened steel as used for the inner ring, it is possible to employ various kinds of bearing steel.

If the amount of retained austenite in the surface layer of the tapered rollers and inner and outer rings is 20–40 vol %, it is possible to provide suitable toughness to the surface layer of each part, and to prevent an excessive increase in stress due to contact with debris. If the retained austenite is less than 20 vol %, toughness will be insufficient. If over 40 vol %, hardness will decrease remarkably, resulting in deterioration of surface roughness due to plastic deformation. On the large end faces of the tapered rollers and the large rib surface of the inner ring, which are in slide contact with each other, seizure may occur due to deterioration in surface roughness.

According to this invention, there is provided a vehicular gear shaft support device wherein a gear shaft is rotatably supported by a tapered roller bearing in a housing in which is sealed oil, characterized in that the tapered rollers are made from a steel containing C: 0.8–1.5 wt %, Si: 0.4–1.2 wt %, Mn: 0.8–1.5 wt % and Cr: 0.8–1.8 wt %, that at least the inner ring is made from a case-hardening steel containing 0.4 wt % or less of carbon, and that a carbo-nitrided layer is formed on the surface layers of the tapered rollers, and inner and outer rollers, it is possible to remarkably prolong the maintenance cycle of e.g. differentials and transmissions.

In the gear shaft support device, by determining the amount of retained austenite in the surface layers of the tapered rollers and inner and outer rings at 20–40 vol %, it is possible to provide suitable toughness to the surface layer of each part, and to prevent an excessive increase in stress due to contact with debris.

Other features and objects of the present invention will become apparent from the following description made with reference to the accompanying drawings, in which:

DETAILED DESCRIPTION OF THE PREFERRED EMBODIMENT

With reference to FIGS. 1 through 4, embodiments of this invention are described. FIGS. 1 and 2show the first embodiment. FIG. 1 shows a differential of an automobile, in which for the support of the shaft of the drive pinion 4 and the shaft of a differential gear case 7 on which is mounted a ring gear 5, a gear shaft support device using tapered roller bearings 2, 3, 6 is employed.

Figure 2:
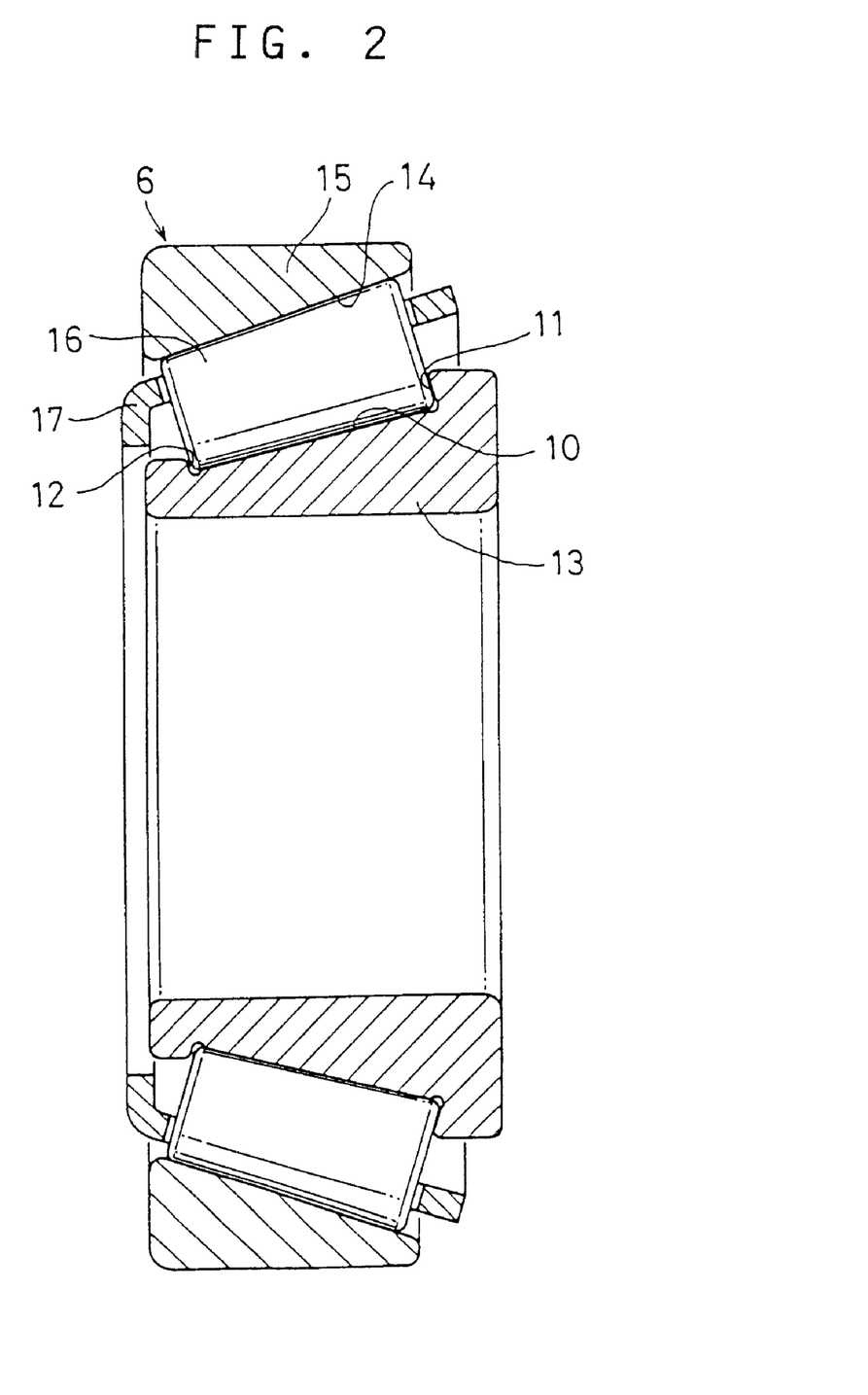
FIG. 2 is a vertical sectional view of a tapered roller bearing as a rolling bearing of a first embodiment, used in the gear shaft support device of FIG. 1.

FIG. 2 shows a tapered roller bearing 6 embodying the present invention. It comprises an outer ring 15 formed with a conical raceway 14, an inner ring 13 with a conical raceway 10, a large rib surface 11 on the large-diameter side of the raceway 10, and a small rib surface 12 on its small-diameter side, a plurality of tapered rollers 16 rollably arranged between the respective raceways 10, 14 of the outer ring 15 and the inner ring 13, and a retainer 17 for retaining the tapered rollers 16 at predetermined circumferential intervals.

Each of the parts including the outer ring 15, inner ring 13 and tapered rollers 16 was manufactured by using a steel having chemical composition shown as Examples in Table 1 as the material, subjecting it to carbo-nitriding in a carburizing atmosphere at 860° C. to which is added ammonia gas, and quenching into oil. On the surfaces of the parts, carbo-nitrided layers in which the amount of retained austenite was 20–40 vol % were formed. For each part of the tapered roller bearings 2, 3, too, similar material was used and subjected to similar heat treatment.

Hereinbelow, the Examples and Comparative Examples of the first embodiment are listed.

EXAMPLES

Tapered roller bearings having tapered rollers and inner and outer rings whose chemical composition, heat treatment, and amount of retained austenite in the surface layers were as shown in Table 1 were prepared as Examples 1–6. Dimensions of the bearings were 40 mm in inner diameter, 68 mm in outer diameter and 19 mm wide.

Comparative Examples

Tapered roller bearings having tapered rollers and inner and outer rings whose chemical compositions, heat treatment and amount of retained austenite in the surface layers were as shown in Table 1 as Comparative Examples 1–8 were prepared. Dimensions of the bearings were the same as in Examples. In Comparative Examples 1 and 2, the chemical compositions of the tapered rollers were outside the range of the present application. In Comparative Examples 3–5, the chemical compositions of the inner ring were out of the range of the present application. In Comparative Examples 6 and 7, the heat treatment for the inner and outer rings were out of the range of the present application, and in Comparative Example 8, the inner and outer rings were heat-treated by mere through hardening.

For the tapered roller bearings of Examples and Comparative Examples, a debris contamination life test and an inner ring rib fatigue test were conducted. Summary of each test and test conditions are as follows.

(Debris contamination life test)

Tapered roller bearings were mounted on a rotary shaft in a lubricating oil bath with debris, and a life test was conducted under the following conditions. The number of test samples for tapered roller bearings was N=10. The endurance life was evaluated in terms of L10 life (time until 90% of samples are usable without breakage) for any sample, breakage of samples were due to surface peeling of the tapered rollers or inner and outer rings.

Applied load: 17.64 kN

Revolution speed: 2000 rpm

Lubricating oil: turbine oil VG56

Debris: gas atomized metallic powder (particle diameter: 100–180 $\mu$m, hardness: HV 700–800, content: 1 g/liter)

(Fatigue test for rib of inner ring)

Shaft end of a roller having a diameter of 10 mm was pressed against a rib of each fixed inner ring while applying a preload, and loads were repeatedly applied in the axial direction of the roller. In this state, a fatigue test was conducted under the following conditions. Fatigue strength was judged by cracks developed at recess of the rib. The number of samples were N=3, and it was determined from S–N curves. Fatigue strength was evaluated at the load corresponding to the number of repeating times of $10^5$.

Applied load: 2.94, 3.92, 4.90 kN (preload 0.49 kN)

Loading speed: 800 cpm (cycle per minute)

The results of each test are shown in Table 2. For the life ratios and fatigue strength ratios in the Table, the value of Comparative Example 8 was used as reference value. For the tapered roller bearings of Examples, the L10 lives in the debris contamination life test were 100 hours or over, and the fatigue strength ratios of the inner ring ribs in the fatigue test were 2.0 times or over. Thus, in either test, good results were obtained.

In contrast, for Comparative Examples 1 and 2, in which the chemical compositions of the tapered rollers were out of the range of the present application, the L10 life in the debris contamination life test was less than 100 hours. Also, for Comparative Examples 3–5, in which the chemical compositions of the inner ring was out of the range of the present application, some of them showed an L10 life exceeding 100 hours, but the fatigue strength of rib of the inner ring was low. This is because the carbon content of the inner ring was high, so that the core hardness after heat treatment was too high. Comparative Examples 6–8, in which the inner and outer rings was not subjected to carbo-nitriding, their test results were all inferior.

Figure 3A:
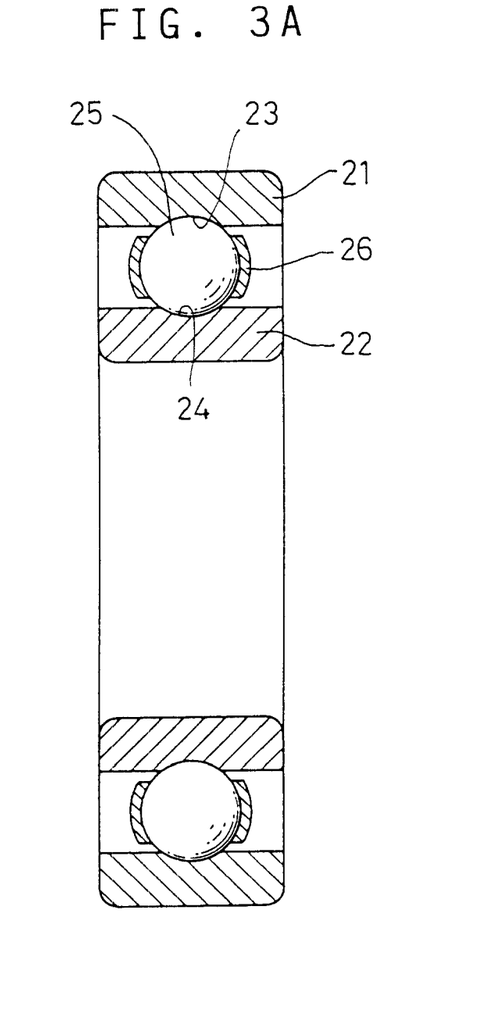
FIG. 3A is a vertical sectional view of a ball bearing as a rolling bearing of a second embodiment.

FIG. 3A shows a ball bearing as a second embodiment of the rolling bearing. In the ball bearing, raceway grooves 23, 24 having an arcuate section are formed on the inner-diameter surface of the outer ring 21 and the outer-diameter surface of the inner ring 22, respectively. Between these raceway grooves 23 and 24, a plurality of balls 25 are retained by a retainer 26.

Figure 3B:
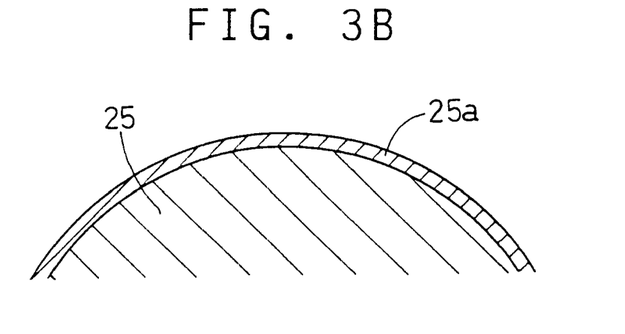
FIG. 3B is a partial enlarged sectional view of the same.

Each ball 25 was made by carbo-nitriding a steel having the chemical compositions shown as Examples in Table 3 in a carburizing atmosphere at 860° C. to which was added ammonia gas, and quenching in a salt bath heated to 220° C. so that the cooling velocity during quenching in the temperature range of from 300° C. to 150° C. would be 0.2 cm$^{-1}$ or less. (Instead of salt bath, a temperature-controlled quenching oil may be used.) As shown in FIG. 3B, on the surface of each ball 25, a carbo-nitrided layer 25a having a retained austenite of 20–50 vol % is formed.

Hereinbelow, the Examples of the second embodiment and Comparative Examples are described.

EXAMPLES

Ball bearings using balls made by heat-treating a steel having chemical compositions shown in Table 3 as Examples 11–14 under the above-described carbo-nitriding and quenching conditions were prepared. Dimensions of the bearings were all 30 mm in inner diameter, 62 mm in outer diameter and the ball diameter was ⅜inches.

Comparative Examples

Ball bearings using balls made by quenching in a salt bath at 860° C. to 220° C. a steel having the same chemical compositions as in Examples 11–14 shown in Table 3 without carbo-nitriding (Comparative Examples 11–14 in Table 3), and ball bearings using balls made by heat-treating steel having chemical compositions that were out of the range of the present application, under the same conditions as in the above-described Examples (Comparative Examples 15–17) were prepared. Also, a ball bearing using balls made by quenching conventional bearing steel SUJ2 (Comparative Example 18 in Table 3) was also prepared. Dimensions of each bearing were the same as those of Examples.

The ball bearings of the Examples and Comparative Examples were mounted on a rotary shaft of a test device to conduct a low-viscosity oil test in which low-viscosity oil is used as a lubricating oil., and the above-described debris contamination test. The test conditions were as follows. The number of samples in each test was N=10. The endurance life was evaluated in L10 life.

(Low-viscosity oil test)

Applied load: 6.86 kN

Revolution speed: 2000 rpm Lubricating oil: high-speed fluid VG1.5

(Debris contamination life test)

Applied load: 6.86 kN

Revolution speed: 2000 rpm

Lubricating oil: turbine oil VG56

Debris: gas atomized metallic powder (particle diameter: 100–180 $\mu$m, hardness: HV 700–800, content: 1 g/liter)

The results of each test are shown in Table 2. For the life ratios in the table, the value for Comparative Example 18 is used as the reference value. For the ball bearings of Examples, the life ratios relative to the Comparative Example 18 were 4.5 times or over and excellent.

In contrast, for Comparative Examples 1 and 2, which were not subjected to carbo-nitriding, the life ratio was less than 3 times. For Comparative Examples 15–17, in which the chemical compositions was not within the range, the life ratio under debris contamination life test was inferior. This is probably because in Comparative Example 15, in which the Si content is excessive, carbo-nitriding is prevented, in Comparative Example 16, in which the Cr content is excessive, carbides become coarse, and in Comparative Example 17, in which the Mn content is too high, the amount of retained austenite in the surface layer exceeds 50 vol %.

Figure 4A:
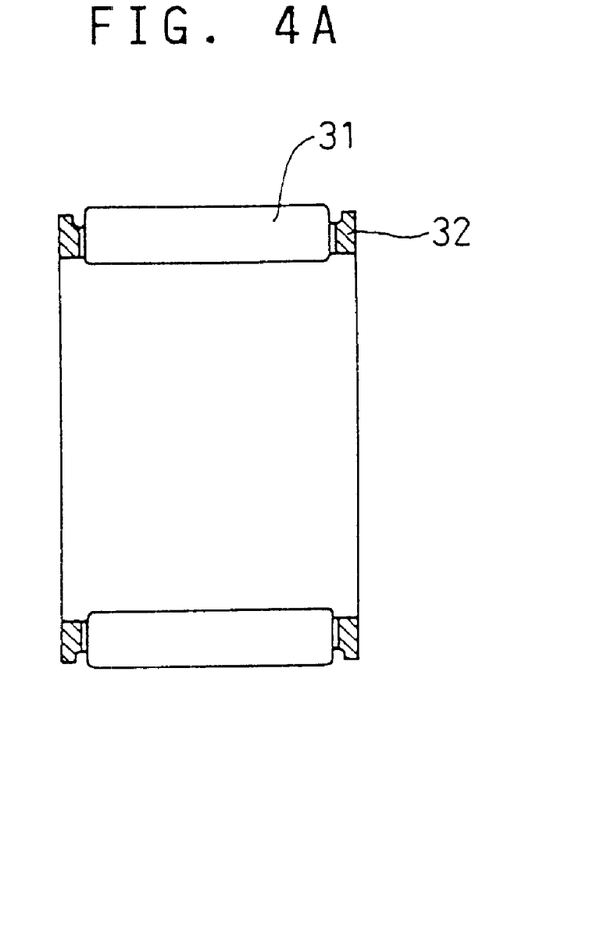
FIG. 4A is a vertical sectional view of a needle roller bearing as a rolling bearing of a third embodiment.
Figure 4B:
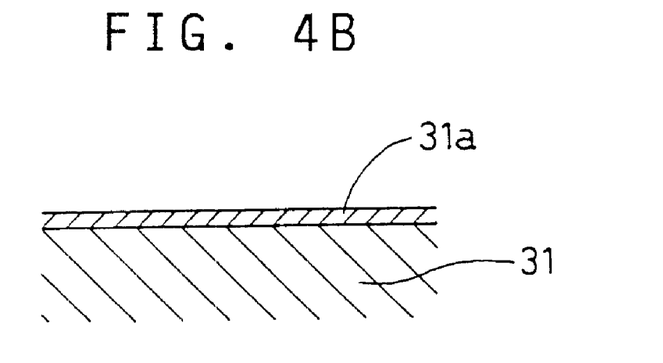
FIG. 4B is a partial enlarged sectional view of the same.

FIG. 4A shows a needle roller bearing as a third embodiment of a rolling bearing. In the needle roller bearing, a plurality of needle rollers 31 are retained by a retainer 32. Each needle roller 31 was made by carbonitriding a steel having the chemical compositions shown as Examples in Table 5 in a carburizing atmosphere at 860° C. to which is added ammonia gas, and quenching in a salt bath heated to 220° C. so that the cooling speed during quenching in the temperature range of from 300° C. to 150° C. would be 0.2 cm$^{-1}$ or less. (Instead of salt bath, a temperature-controlled quenching oil may be used.) As shown in FIG. 4B, on the surface of each needle roller 31, a carbo-nitrided layer 31a having a retained austenite content of 20–40 vol % and the surface hardness of HV 750 or over was formed.

Next, Examples of the third embodiment and the comparative Examples are described.

EXAMPLES

Examples 21–24 shown in Table 5 are needle roller bearings having needle rollers manufactured by subjecting steels having chemical compositions shown in Table 5 to heat treatment under the same carbo-nitriding and quenching conditions as described above. All the bearings had an inner diameter of 24 mm and an outer diameter of 32 mm.

Comparative Examples

Comparative Examples 21–24 in Table 5 are needle roller bearings whose needle rollers were made from steels having the same chemical compositions as Examples 21–24 without carbo-nitriding by quenching into a salt bath at 220° C. from 860° C. Comparative Examples 25–27 are needle roller bearings of which the needle rollers were manufactured from steels whose chemical compositions were out of the range of the present invention to the above-mentioned heat treatment. Comparative Example 28 is a needle roller bearing of which the needle rollers were manufactured by quenching a conventional bearing steel SUJ2. All these bearings have the same dimensions as the bearing of Examples.

These Examples and Comparative Examples were subjected to a rolling test in which each needle rollers was rolled on a steel ball having a rough surface to accelerate the initiation of surface damage, and a life test in debris contaminated lubrication. The number of samples for each test was N=10, and the life was evaluated in terms of the L10 life.

(Rolling test)

Mating ball: ⅝inch (surface roughness Ra=0.08 μm)

Maximum contact pressure: 5.9 GPa

Loading speed: 14600 cycles per minute

Lubricant: turbine oil VG10

(Debris contamination life test)

Load applied: 5.88 kN

Revolution speed: 7000 rpm

Lubricant: turbine oil VG56 (oil bath)

Debris mixed: gas-atomized metallic powder (particle diameter: 32–53 μm, hardness: Hv 700–800, Mixed rate: 0.4 gram per liter)

The results of the tests are shown in Table 6. The L10 life is shown in the ratio to the L10 life of Comparative Example 28. As shown, the life of any of the Examples was at least 5 times the life of. Comparative Example 28.

In contrast, the L10 life of any of Comparative Examples 21–24 was shorter than three times the L10 life of Comparative Example 28. For Comparative Examples 25–27, the life ratio in the debris contamination life test was inferior, though the life ratio in the rolling test was relatively high.

According to the present invention, a steel in which the Si and Mn contents are increased is used as the material for at least the rollers, and this is quenched after carbo-nitriding so that the amount of retained austenite in the roller surface layer will be 20–50 vol %. It is thus possible to prevent surface peeling due to the initiation and propagation of cracks, and to remarkably improve the endurance life in environments in which debris contamination or the temperature rise at bearing portions is large.

Further, in the case of needle roller bearings, by setting the amount of retained austenite in the surface layer of the needle rollers as the rolling elements at 20–40 vol %, and the surface hardness at Hv 750 or over, it is possible to prevent surface peeling of the needle rollers, which are subjected to severe temperature rise, and to prolong its life.

Further, in the case of a tapered roller bearing, of the inner and outer rings, at least the inner ring with ribs is made from a case-hardened steel containing 0.4 wt % or less of carbon, and carbo-nitrided layers are formed on the surface layers of the inner and outer rings to ensure fatigue strength at the inner ring rib portions and to prolong its life.

Also, with the automotive gear shaft support device according to the present invention, since the gear shaft is supported by the above-described tapered roller bearing, it is possible to remarkably prolong the cycle of maintenance of the power transmission device such as differentials.

TABLE 1

| | Chemical composition of tapered roller (wt %) | | | | | | | Carbon content of inner and outer rings (wt %) | | | |
|---|---|---|---|---|---|---|---|---|---|---|---|
| Specimen | C | Si | Mn | Cr | Mo | Heat treatment | Retained γ | C | Heat treatment | Retained γ | Core hardness |
| Example 1 | 1.0 | 0.5 | 1.0 | 1.1 | — | Carbo-nitriding | 32 | 0.22 | Carbo-nitriding | 25 | 40 |
| Example 2 | 1.0 | 0.5 | 1.0 | 1.2 | — | Carbo-nitriding | 33 | 0.25 | Carbo-nitriding | 23 | 43 |
| Example 3 | 0.8 | 1.2 | 1.0 | 1.2 | — | Carbo-nitriding | 26 | 0.35 | Carbo-nitriding | 29 | 53 |
| Example 4 | 1.1 | 0.5 | 1.0 | 1.2 | 0.25 | Carbo-nitriding | 30 | 0.25 | Carbo-nitriding | 38 | 44 |

TABLE 1-continued

| | Chemical composition of tapered roller (wt %) | | | | | | | Carbon content of inner and outer rings (wt %) | | |
|---|---|---|---|---|---|---|---|---|---|---|
| Specimen | C | Si | Mn | Cr | Mo | Heat treatment | Retained γ | C | Heat treatment | Retained γ | Core hardness |
| Example 5 | 1.5 | 0.4 | 0.8 | 1.8 | — | Carbo-nitriding | 27 | 0.35 | Carbo-nitriding | 35 | 54 |
| Example 6 | 1.2 | 0.6 | 1.5 | 1.0 | — | Carbo-nitriding | 35 | 0.40 | Carbo-nitriding | 32 | 55 |
| Compara. example 1 | 0.35 | 0.25 | 0.85 | 1.1 | — | Carbo-nitriding | 38 | 0.22 | Carbo-nitriding | 25 | 43 |
| Compara. example 2 | 0.35 | 0.5 | 1.1 | 0.55 | 0.25 | Carbo-nitriding | 36 | 0.40 | Carbo-nitriding | 32 | 56 |
| Compara. example 3 | 1.0 | 0.5 | 1.0 | 1.1 | — | Carbo-nitriding | 32 | 1.02 | Carbo-nitriding | 32 | 61 |
| Compara. example 4 | 1.0 | 0.5 | 1.0 | 1.1 | — | Carbo-nitriding | 32 | 0.75 | Carbo-nitriding | 23 | 60 |
| Compara. example 5 | 1.0 | 0.5 | 1.0 | 1.1 | — | Carbo-nitriding | 32 | 0.50 | Carbo-nitriding | 38 | 58 |
| Compara. example 6 | 1.0 | 0.5 | 1.0 | 1.1 | — | Carbo-nitriding | 32 | 0.22 | Carburizing | 26 | 44 |
| Compara. example 7 | 1.1 | 0.5 | 1.0 | 0.5 | — | Carbo-nitriding | 29 | 0.40 | Carburizing | 32 | 56 |
| Compara. example 8 | 1.0 | 0.5 | 1.0 | 1.1 | — | Carbo-nitriding | 32 | 1.02 | Through hardening | 7 | 60 |

Note)
Retained γ (austenite) is in vol % at the surface layer. Inside hardness is in HRC.

TABLE 2

| | Debris contamination life test | | Fatigue test for rib of inner ring | |
|---|---|---|---|---|
| Specimen | L10 life (hr) | Life ratio | Fatigue strength (kN) | Strength ratio |
| Example 1 | 115 | 4.1 | 5.13 | 2.3 |
| Example 2 | 105 | 3.8 | 5.33 | 2.4 |
| Example 3 | 101 | 3.6 | 4.90 | 2.2 |
| Example 4 | 106 | 3.8 | 5.35 | 2.4 |
| Example 5 | 109 | 3.9 | 4.70 | 2.1 |
| Example 6 | 128 | 4.6 | 6.04 | 2.0 |
| Compara. example 1 | 89 | 3.2 | 5.13 | 2.3 |
| Compara. example 2 | 92 | 3.3 | 4.68 | 2.1 |
| Compara. example 3 | 115 | 4.1 | 3.34 | 1.5 |
| Compara. example 4 | 99 | 3.5 | 3.56 | 1.6 |
| Compara. example 5 | 76 | 2.7 | 3.57 | 1.6 |
| Compara. example 6 | 24 | 0.9 | 3.89 | 1.7 |
| Compara. example 7 | 46 | 1.6 | 4.00 | 1.8 |
| Compara. example 8 | 28 | 1.0 | 2.23 | 1.0 |

Note)
The fatigue strength compounds to the load for repetition times $10^5$.

TABLE 3

| | Chemical composition (wt %) | | | | | Carbo-nitriding |
|---|---|---|---|---|---|---|
| Specimen | C | Si | Mn | Cr | Mo | |
| Example 11 | 1.0 | 0.5 | 1.0 | 1.5 | — | o |
| Example 12 | 1.0 | 0.5 | 1.0 | 0.9 | — | o |
| Example 13 | 0.8 | 1.2 | 1.0 | 0.8 | — | o |
| Example 14 | 1.1 | 0.5 | 1.0 | 0.9 | 0.2 | o |
| Compara. example 11 | 1.0 | 0.5 | 1.0 | 1.5 | — | x |
| Compara. example 12 | 1.0 | 0.5 | 1.0 | 0.9 | — | x |
| Compara. example 13 | 0.8 | 1.2 | 1.0 | 0.8 | — | x |
| Compara. example 14 | 1.1 | 0.5 | 1.0 | 0.9 | 0.2 | x |
| Compara. example 15 | 1.1 | 1.5 | 1.0 | 1.5 | — | o |
| Compara. example 16 | 1.1 | 0.7 | 1.0 | 2.0 | — | o |
| Compara. example 17 | 1.1 | 0.7 | 1.8 | 1.1 | — | o |
| Compara. example 18 | 1.0 | 0.2 | 0.5 | 1.5 | — | x |

TABLE 4

| | Low-viscosity oil test | | Debris contamination life test | |
|---|---|---|---|---|
| Specimen | L10 life (hr) | Life ratio | L10 life (hr) | Life ratio |
| Example 11 | 482 | 5.2 | 93 | 4.9 |
| Example 12 | 420 | 4.6 | 99 | 5.2 |
| Example 13 | 431 | 4.7 | 95 | 5.0 |
| Example 14 | 503 | 5.5 | 108 | 6.1 |
| Compara. example 11 | 251 | 2.7 | 34 | 1.8 |
| Compara. example 12 | 205 | 2.3 | 40 | 2.1 |
| Compara. example 13 | 218 | 2.4 | 38 | 2.0 |
| Compara. example 14 | 260 | 2.9 | 44 | 2.3 |

TABLE 4-continued

| Specimen | Low-viscosity oil test | | Debris contamination life test | |
|---|---|---|---|---|
| | L10 life (hr) | Life ratio | L10 life (hr) | Life ratio |
| Compara. example 15 | 437 | 4.8 | 53 | 2.8 |
| Compara. example 16 | 380 | 4.2 | 36 | 1.9 |
| Compara. example 17 | 303 | 3.3 | 57 | 3.0 |
| Compara. example 18 | 91 | 1.0 | 19 | 1.0 |

TABLE 5

| Specimen | Chemical composition (wt %) | | | | | Carbo-nitriding |
|---|---|---|---|---|---|---|
| | C | Si | Mn | Cr | Mo | |
| Example 21 | 1.0 | 0.6 | 1.0 | 1.4 | — | ○ |
| Example 22 | 1.2 | 0.6 | 1.0 | 1.2 | — | ○ |
| Example 23 | 0.8 | 1.2 | 1.0 | 0.8 | — | ○ |
| Example 24 | 1.1 | 0.6 | 1.0 | 1.4 | 0.2 | ○ |
| Compara. example 21 | 1.0 | 0.6 | 1.0 | 1.4 | — | x |
| Compara. example 22 | 1.2 | 0.6 | 1.0 | 1.2 | — | x |
| Compara. example 23 | 0.8 | 1.2 | 1.0 | 0.8 | — | x |
| Compara. example 24 | 1.1 | 0.6 | 1.0 | 1.4 | 0.2 | x |
| Compara. example 25 | 1.1 | 1.5 | 1.0 | 1.5 | — | ○ |
| Compara. example 26 | 1.1 | 0.7 | 1.0 | 2.0 | — | ○ |
| Compara. example 27 | 1.1 | 0.7 | 1.8 | 1.1 | — | ○ |
| Compara. example 28 | 1.0 | 0.2 | 0.5 | 1.5 | — | x |

TABLE 6

| Specimen | Low-viscosity oil test | | Debris contamination life test | |
|---|---|---|---|---|
| | L10 life (hr) | Life ratio | L10 life (hr) | Life ratio |
| Example 21 | 3030 × 10$^4$ | 5.0 | 130 | 6.2 |
| Example 22 | 3780 × 10$^4$ | 6.2 | 109 | 5.2 |
| Example 23 | 3290 × 10$^4$ | 5.4 | 111 | 5.3 |
| Example 24 | 3800 × 10$^4$ | 6.2 | 128 | 6.1 |
| Compara. example 21 | 1540 × 10$^4$ | 2.5 | 61 | 2.9 |
| Compara. example 22 | 1330 × 10$^4$ | 2.2 | 58 | 2.8 |
| Compara. example 23 | 1480 × 10$^4$ | 2.4 | 48 | 2.3 |
| Compara. example 24 | 1500 × 10$^4$ | 2.5 | 60 | 2.9 |
| Compara. example 25 | 3000 × 10$^4$ | 4.9 | 73 | 3.5 |
| Compara. example 26 | 2490 × 10$^4$ | 4.1 | 72 | 3.4 |
| Compara. example 27 | 2300 × 10$^4$ | 3.8 | 70 | 3.3 |
| Compara. example 28 | 610 × 10$^4$ | 1.0 | 21 | 1.0 |

What is claimed is:

1. A method of manufacturing a rolling bearing having rolling elements, said method comprising forming said rolling elements from a steel containing C: 0.8 to 1.5 wt %, Si: 0.4 to 1.2 wt %, Mn: 0.8 to 1.5 wt % and Cr: 0.8 to 1.8 wt %, and carbo-nitriding, quenching and tempering said rolling elements so that the amount of retained austenite in a surface layer will be 20 to 50 vol %, said quenching being started at a temperature of 830 to 880° C., and the cooling ability during quenching in a temperature range of 300° C. to 150° C. being adjusted to 0.2 cm$^{-1}$ or less, thereby decreasing sensitivity to cracks to 3 or less.

2. The method as recited in claim 1 wherein 0.3 wt % or less of molybdenum is added to said steel.

3. A rolling bearing manufactured by the method of claim 2.

4. The method as recited in claim 1 wherein said rolling elements are needle rollers, and wherein the amount of retained austenite in the surface layer is 20 to 40 vol %, and the surface hardness is Hv 750 or more.

5. A rolling bearing manufactured by the method of claim 4.

6. The method as recited in claim 1 wherein the rolling bearing comprises an inner ring, an outer ring and rolling elements, wherein said rolling elements are tapered rollers, wherein at least said inner ring is made from a case-hardened steel containing 0.4 wt % or less of carbon, and wherein on the surface layers of said inner and outer rings, a carbo-nitrided layer is formed.

7. A rolling bearing manufactured by the method of claim 6.

8. The method as recited in claim 6 wherein the amount of retained austenite in the surface layer of said tapered rollers and said inner and outer rings is 20 to 40 vol %.

9. A rolling bearing manufactured by the method of claim 8.

10. A rolling bearing manufactured by the method of claim 1.

11. A method of manufacturing an automotive gear shaft support device wherein a gear shaft is rotatably supported by a tapered roller bearing in a housing in which is sealed oil, said tapered roller bearing comprising an inner ring, an outer ring and tapered rollers, said method comprising:

forming said tapered rollers from a steel containing C: 0.8 to 1.5 wt %, Si: 0.4 to 1.2 wt %, Mn: 0.8 to 1.5 wt % and Cr: 0.8 to 1.8 wt %;

carbo-nitriding, quenching and tempering said tapered rollers so that the amount of retained austenite in a surface layer will be 20 to 50 vol %;

said quenching being started at a temperature of 830 to 880° C., and the cooling ability during quenching in a temperature range of 300° C. to 150° C. being adjusted to 0.2 cm$^{-1}$ or less, thereby decreasing sensitivity to cracks to 3 or less;

forming at least said inner ring from a case-hardened steel containing 0.4 wt % or less of carbon; and forming carbo-nitrided layers on the surfaces of said tapered rollers and said inner and outer rings.

12. The method as recited in claim 11 wherein the amount of retained austenite in the surface layers of said tapered rollers and said inner and outer rings is 20 to 40 vol %.

13. An automotive gear shaft support device manufactured by the method of claim 12.

14. An automotive gear shaft support device manufactured by the method of claim 11.

* * * * *